No. 640,857. Patented Jan. 9, 1900.
W. P. BARTEL.
MACHINE FOR SETTING LACING STUDS.
(Application filed Apr. 24, 1899.)
(No Model.) 4 Sheets—Sheet 1.

WITNESSES:
INVENTOR:

No. 640,857. Patented Jan. 9, 1900.
W. P. BARTEL.
MACHINE FOR SETTING LACING STUDS.
(Application filed Apr. 24, 1899.)
(No Model.) 4 Sheets—Sheet 2.

No. 640,857. Patented Jan. 9, 1900.
W. P. BARTEL.
MACHINE FOR SETTING LACING STUDS.
(Application filed Apr. 24, 1899.)
(No Model.) 4 Sheets—Sheet 3.
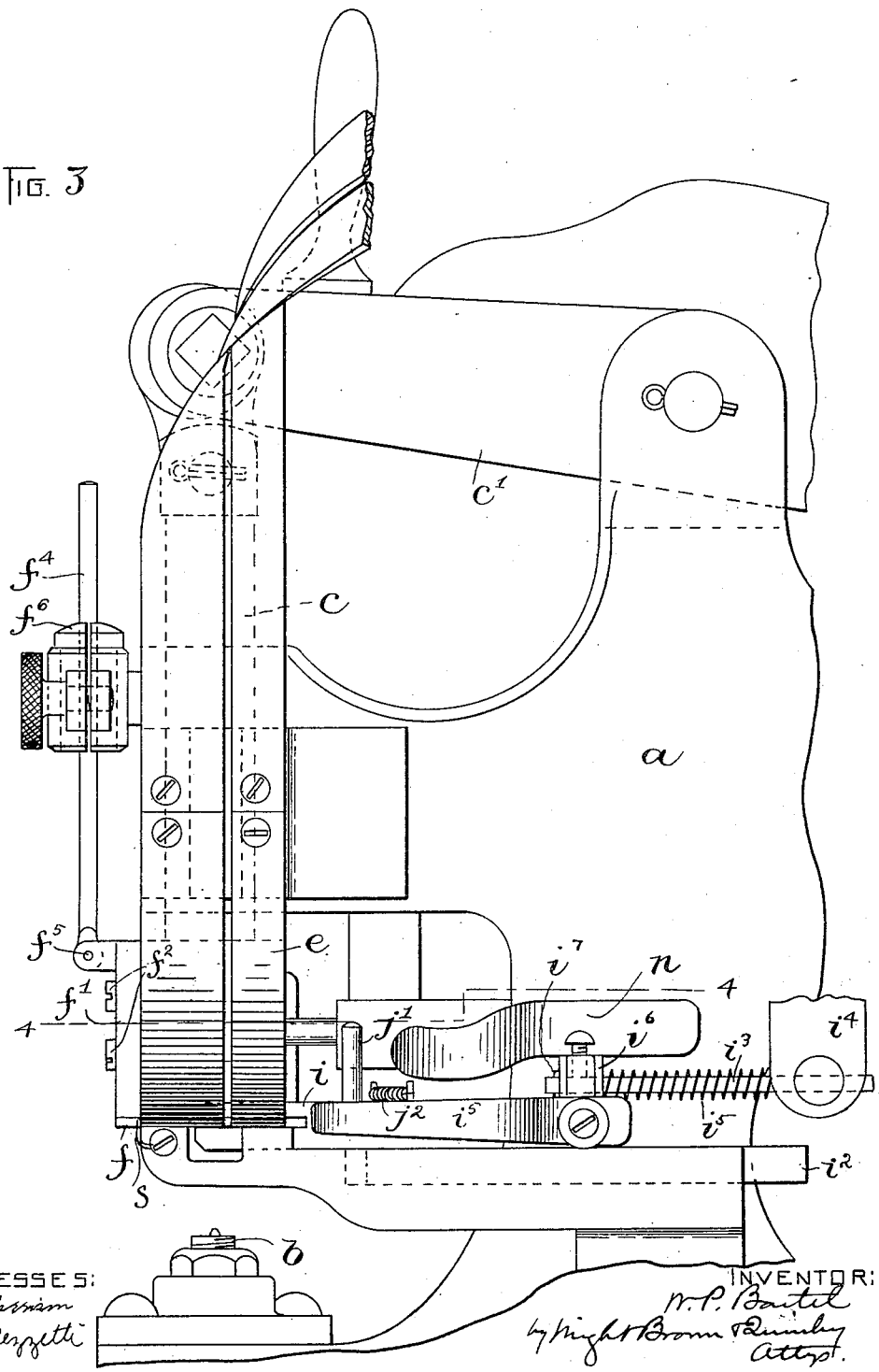

No. 640,857. Patented Jan. 9, 1900.
W. P. BARTEL.
MACHINE FOR SETTING LACING STUDS.
(Application filed Apr. 24, 1899.)
(No Model.) 4 Sheets—Sheet 4.
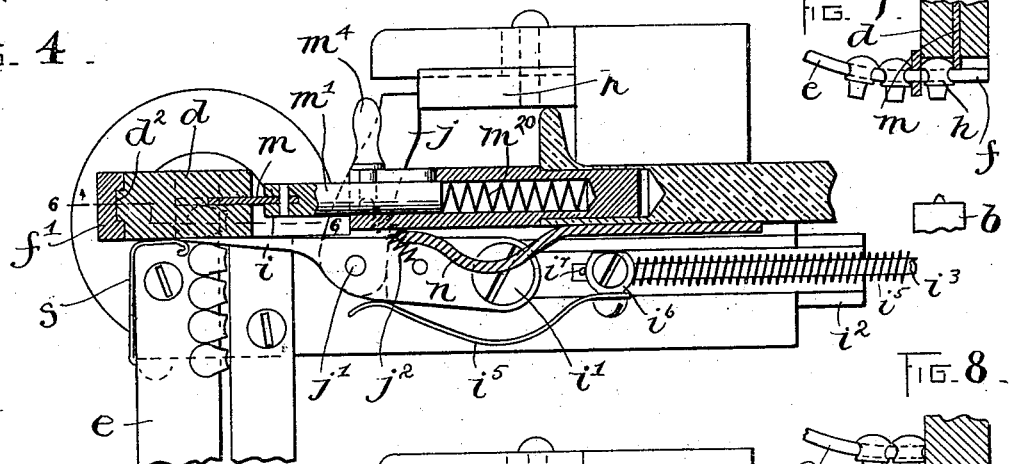
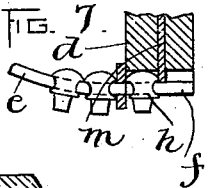
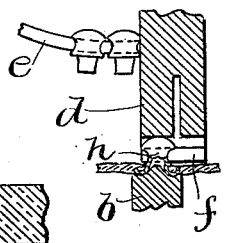
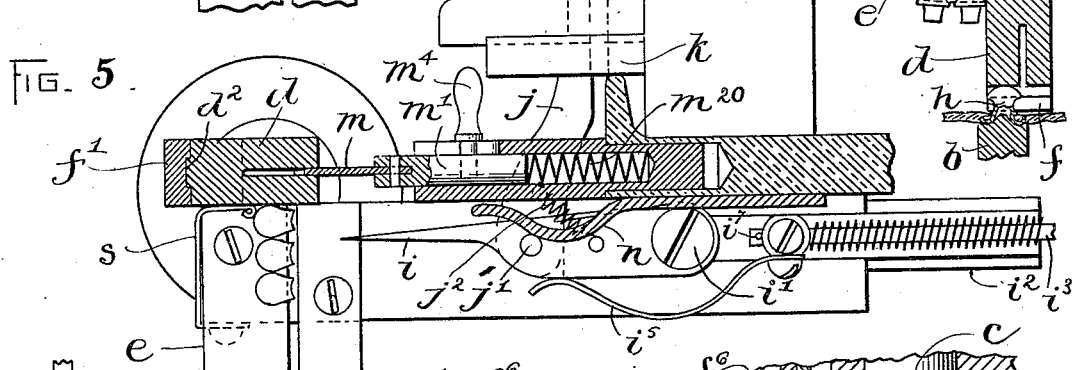
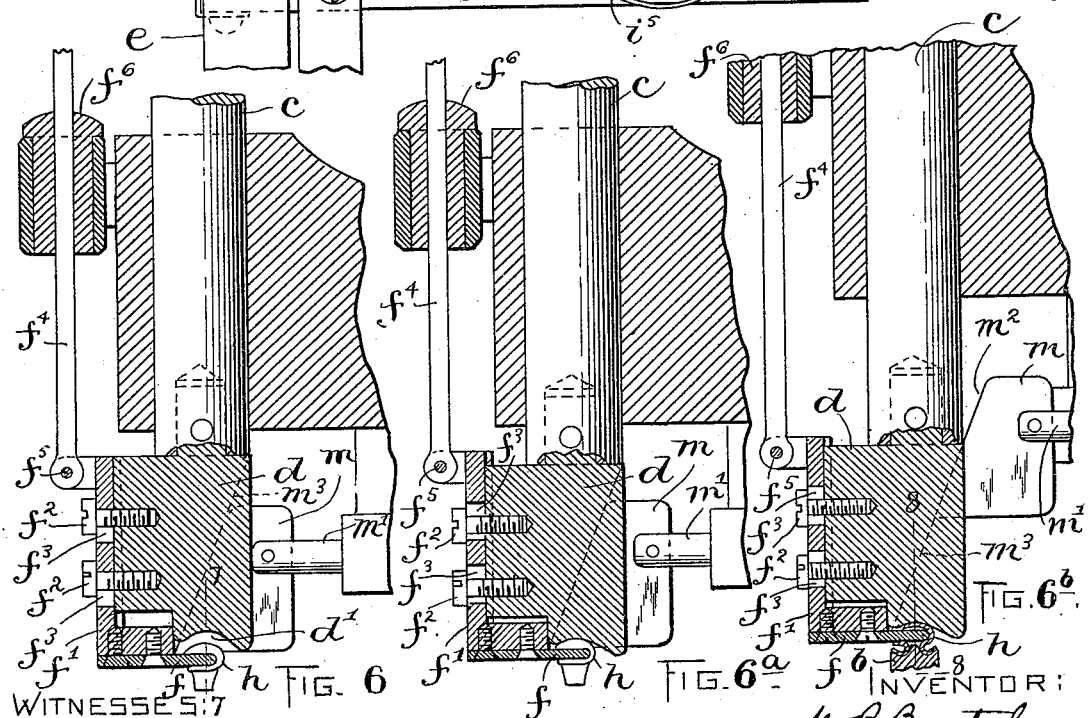
WITNESSES:
INVENTOR:

UNITED STATES PATENT OFFICE.

WILLIAM P. BARTEL, OF WALTHAM, MASSACHUSETTS, ASSIGNOR OF THREE-FOURTHS TO THE JUDSON L. THOMSON MANUFACTURING COMPANY, OF SAME PLACE.

MACHINE FOR SETTING LACING-STUDS.

SPECIFICATION forming part of Letters Patent No. 640,857, dated January 9, 1900.

Application filed April 24, 1899. Serial No. 714,263. (No model.)

*To all whom it may concern:*

Be it known that I, WILLIAM P. BARTEL, of Waltham, in the county of Middlesex and State of Massachusetts, have invented certain new and useful Improvements in Machines for Setting Lacing-Hooks, of which the following is a specification.

This invention has for its object to provide certain improvements in machines for setting lacing-hooks whereby the hooks will be accurately supplied to the setting mechanism and provision will be made for conveniently removing the hooks and the work to which they are attached from the position they occupy while being set.

The invention consists in the improvements which I will now proceed to describe and claim.

Figure 1:
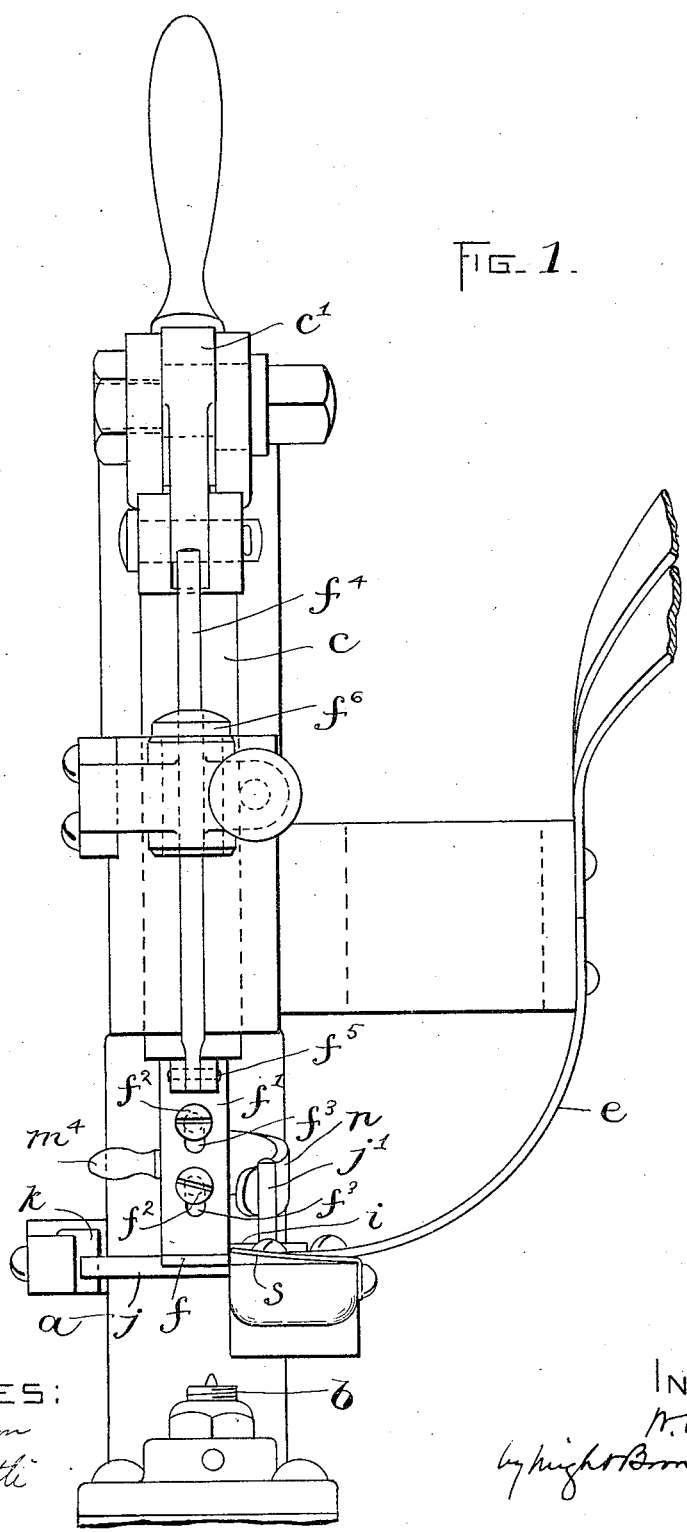
Figure 2:
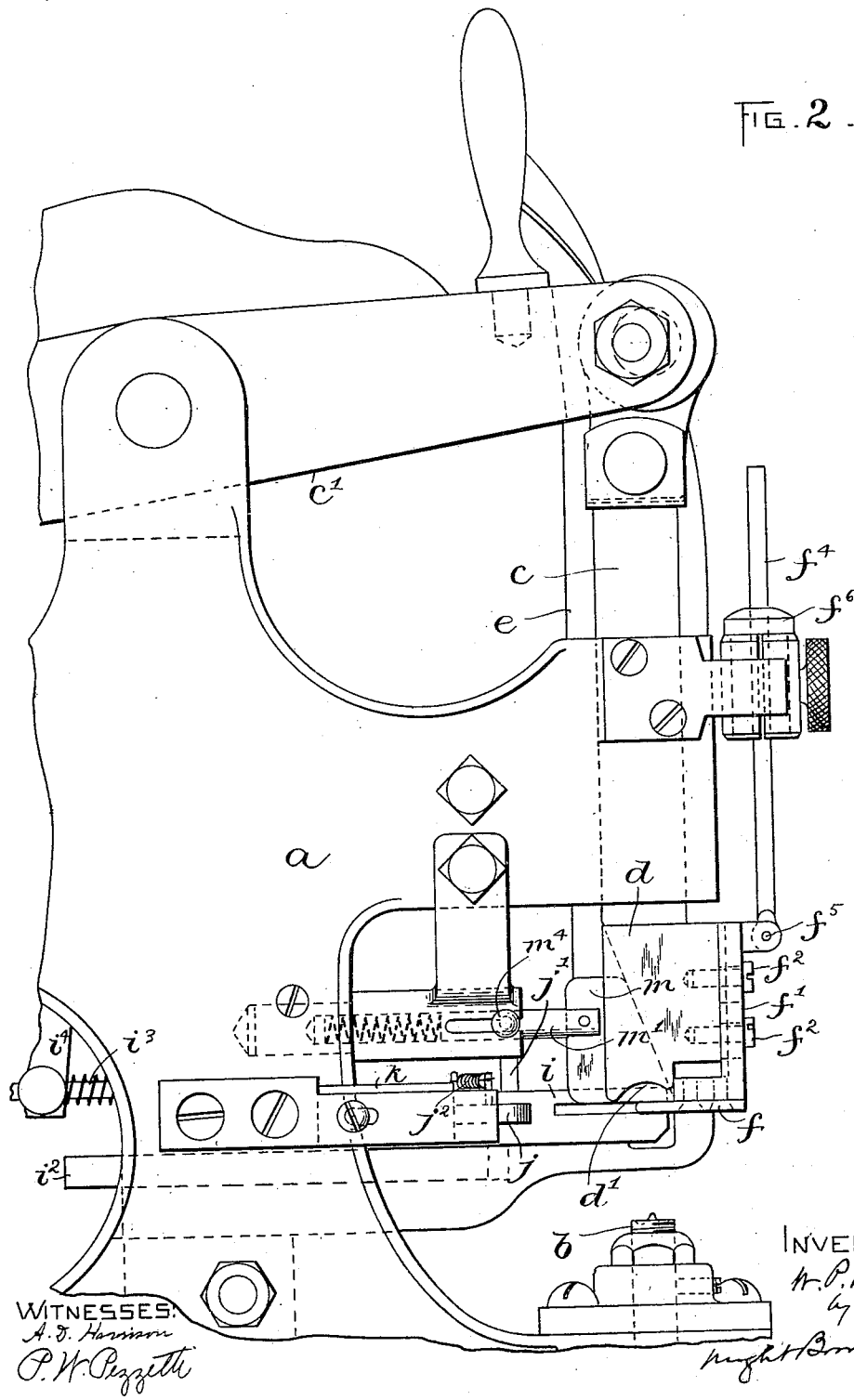

Of the accompanying drawings, forming a part of this specification, Figure 1 represents a front end elevation of a portion of a machine embodying my invention. Fig. 2 represents a rear side elevation of the same. Fig. 3 represents a front side elevation. Fig. 4 represents a section on line 4 4 of Fig. 3, showing a hook in position to be set. Fig. 5 represents a view similar to Fig. 4, showing the inoperative position of the hook transferring and holding devices. Fig. 6 represents a section on line 6 6 of Fig. 4. Figs. 6ª and 6ᵇ represent views similar to Fig. 6, showing the parts in different positions. Fig. 7 represents a section on line 7 7 of Fig. 6. Fig. 8 represents a section on line 8 8 of Fig. 6ᵇ.

The same letters of reference indicate the same parts in all the figures.

In the drawings, $a$ represents the supporting-frame, and $b$ the fixed die, which upsets the tubular shank of a lacing-hook.

$c$ is a plunger which is movable in a guide in the frame $a$ toward and from the upsetting-die and is reciprocated by suitable mechanism, including a lever $c'$, connected with the upper end of the plunger.

$d$ represents a head affixed to the lower end of the plunger $c$ and provided in its lower end face with a concavity $d'$, formed to fit the convex head of a lacing-hook $h$.

$e$ represents a fixed raceway formed to conduct a column of lacing-hooks from a reservoir (not shown) to a point adjacent to the lower portion of the head $d$ when said head is in its highest position, as shown in Fig. 6.

$f$ represents a jaw formed to enter the throat of a lacing-hook and attached to an L-shaped holder $f'$, which has a limited vertical sliding movement on the head $d$, the vertical portion of the holder being grooved to receive a projection $d^2$, Figs. 4 and 5, on said head. The said sliding movement is limited by studs $f^2$ $f^2$ on the head $d$ and slots $f^3$ $f^3$ in the holder $f'$. A rod $f^4$, connected at $f^5$ with the holder $f'$, slides in a friction-clamp $f^6$, attached to the frame $a$, said rod and clamp offering frictional resistance to movements of the holder $f'$ and jaw $f$, the arrangement being such that when the plunger $c$ and head $d$ commence to descend from the position shown in Fig. 6 the jaw $f$ will not commence to descend until the studs $f^2$ abut against the lower ends of the slots $f^3$, after which the jaw $f$ moves downwardly with the head $d$. The jaw and head are thus caused to close upon the head of a lacing-hook, as shown in Fig. 6ª, and hold the same firmly during the operation of upsetting the shank of the hook, as shown in Fig. 6ᵇ. When the head $d$ commences to rise from the position shown in Fig. 6ᵇ, the jaw $f$ remains stationary until the studs $f^2$ abut against the upper ends of the slots $f^3$, the jaw $f$ then rising with the head $d$ to the position shown in Fig. 6, the cavity $d'$ being then separated from the jaw $f$ to permit the entrance of a hook between said cavity and jaw, as hereinafter explained.

When the jaw $f$ is in the position shown in Fig. 1, it registers with and constitutes an extension of the lower end of the raceway, as shown in Fig. 7, so that the lowest hook in the raceway can be transferred to the jaw. This transference is accomplished by means of a transferring-finger $i$, to which a series of movements are imparted, as will be next described.

The finger $i$ is pivoted at $i'$ to a slide $i^2$, which is movable horizontally in a guide in the frame $a$ and is connected by a rod $i^3$ with a lever $i^4$, which is oscillated by a connection (not shown) with the driving-shaft of the machine and reciprocates the slide $i^2$, which moves toward and from the raceway $e$. The extremes of the back-and-forth movements of the slide $i^2$ are shown in Figs. 4 and 5, Fig. 5 showing the slide at the rear and Fig. 4 at the forward extreme.

When the slide is at the rear end of its movement, an arm $j$, pivoted at $j'$ to the finger $i$, bears against a fixed guide $k$ and holds the point of the finger $i$ farther from the end of the raceway than when the slide is at the forward end of its movement. When the slide moves forward, the pointed end of the finger $i$ is inserted between the foremost hook in the raceway and the one behind it before the arm $j$ leaves the guide $k$. A spring $i^3$, carried by the slide $i^2$, bears on the finger $i$ and swings it laterally to the position shown in Fig. 4 when the arm $j$ leaves the guide $k$. This movement of the finger forces the foremost hook onto the jaw $f$, the finger standing at one side of the head $d$ and coöperating with the stop $m$, hereinafter described, in retaining the said hook in place on the jaw until the head of the hook is clamped between the head and jaw by the downward movement of the head, as above described. When the slide $i^2$ moves backwardly, the arm $j$, which now bears against the outer end of the guide $k$, as shown in Fig. 4, swings outwardly toward the head $d$ on its pivot $j'$ until a projection on the finger $i$, here shown as the pivot $j'$, strikes a curved guide $n$, affixed to the frame $a$, and swings the finger $i$ away from the head $d$, thus permitting a spring $j^2$, which connects the arm $j$ with the finger $i$, to pull the arm $j$ backwardly, so that its outer end is in position to bear against the guide $k$, as shown in Fig. 4, when the slide $i^2$ and finger $i$ again move forward. There is sufficient distance between the pivot $j'$ and the curved guide $n$ to permit the finger to move backwardly from the position shown in Fig. 4 parallel with the side of the head $d$ until the finger is withdrawn from contact with the foremost hook in the chute $e$. When the finger moves forward, the guide $k$ directs the point of the finger so that it enters between the foremost hook and the next one before the arm $j$ leaves the said guide, the spring $i^3$ then acting to force the finger $i$ against the head $d$, as shown in Fig. 4.

The stop $m$, above referred to as coöperating with the finger $i$ in holding the hook in place between the head $d$ and jaw $f$, is a plate attached to a slide $m'$, which is movable in a guide on the frame $a$ and is pressed by a spring $m^{20}$, Figs. 4 and 5, toward the head $d$. Said plate enters a slot in the head and has an inclined edge $m^2$, Fig. 6$^b$, bearing against the correspondingly-inclined inner wall $m^3$ of the slot. The plate $m$ is arranged so that when the head $d$ is raised the plate will project over the jaw $f$ in position to obstruct the hook forced between the jaw and head by the finger $i$, so that the hook is confined against movement in either direction crosswise of the head, as indicated in Fig. 7. When the head descends, the incline $m^3$ presses back the plate $m$, as shown in Fig. 6$^b$, so that while the head is depressed the hook last set can be removed from either side of the head, the finger $i$ being at this time in the position shown in Fig. 5, so that both ends of the jaw $f$ are unobstructed, and the hook can be moved from it in either direction.

The slide $m'$ is provided with a handle $m^4$, by which it can be retracted to remove the plate $m$ from the head $d$ to permit the removal of a hook from the jaw while the head is in a raised position.

$s$ represents a spring-finger arranged to bear on the foremost hook on the raceway and arrest the same, preventing its head from projecting beyond the end of the raceway and thus interfering with the head $d$. Said spring is displaced when the finger $i$ moves forward, as shown in Fig. 4.

$i^5$ represents a spring which surrounds the rod $i^3$ and is interposed between the lever $i^4$ and the stud $i^6$ on the slide $i^2$. The rod $i^3$ is not positively attached to said stud, but is adapted to slide therein, so that if the finger $i$ in advancing encounters an obstruction, such as a misplaced hook, the finger and slide will stop and the rod $i^3$ will slide in the stud, the spring $i^5$ yielding at the same time. When the obstruction is removed, the spring expands to restore the finger to its normal position relatively to the lever $i^4$. The rod $i^3$ has a head or projection $i^7$, which bears against the stud $i^6$, as shown in Fig. 3, when the slide and finger are at their normal distance from the lever $i^4$.

I claim—

1. A machine of the character specified, comprising a fixed raceway, a head movable vertically beside the lower end of the raceway, a jaw movable with the head and having a limited independent movement, means for yieldingly retaining the jaw in either a hook-grasping or a hook-releasing position, the jaw being arranged to coincide with the lower end of the raceway when the head is raised, a finger arranged to transfer a hook from the raceway to the jaw when the head is raised, said finger forming a stop to prevent movement of the hook from the jaw in one direction, a yielding stop arranged to prevent movement of the hook from the jaw in the opposite direction, said stops being arranged to coöperate with the jaw only when the latter is in its raised position, and means for displacing said stops when the head and jaw descend, whereby the jaw is left unobstructed at both ends when depressed.

2. A machine of the character specified, comprising a fixed raceway, a head movable vertically beside the lower end of the raceway, a jaw having a limited independent movement on the head and adapted to move with the head, the jaw coinciding with the raceway when the head is raised, means for holding the jaw yieldingly in either of two positions as described, a transferring-finger and mechanism for operating the same, with provisions for holding the finger at one side of the head after the insertion of a hook between the jaw and head and while the hook is being grasped by the jaw and head, and a yielding stop-plate movable in a slot or guide in the head and arranged to project over the jaw and coöperate with the finger in holding a hook in place in the jaw, said plate and head having provisions for the displacement of the plate by the descent of the head and jaw, whereby the jaw is left unobstructed at both ends when the head is depressed.

3. The combination of the raceway, the vertically-reciprocating head, the jaw movable with the head and having a limited independent movement, the transferring-finger, and the means for operating it, said means comprising the reciprocating slide to which the finger is pivoted, the finger-pressing spring on said slide, the spring-held arm pivoted to the finger, the rectilinear guide which coöperates with said arm in guiding and releasing the finger during its forward movement, and the curved guide which laterally displaces the finger during its backward movement.

4. The combination of the raceway, the vertically-reciprocating head having a slot with an inclined wall, the jaw movable with the head and having a limited independent movement, the transferring-finger, means for operating said finger, the movable stop $m$ formed to enter said slot and having an inclined edge, and the spring-pressed slide carrying said stop.

5. The combination of the raceway, the vertically-reciprocating head, the jaw movable with the head and having an independent movement, the transferring-finger, and means for operating said finger, said means having provisions for permitting the finger to yield to an obstruction.

In testimony whereof I have affixed my signature in presence of two witnesses.

WILLIAM P. BARTEL.

Witnesses:
C. F. BROWN,
A. D. HARRISON.